Sept. 11, 1956 E. O'SULLIVAN 2,762,489
APPARATUS FOR THE TRANSPORTING AND STORING OF GOODS
Filed March 16, 1951 4 Sheets-Sheet 1

Inventor
EUGENE O'SULLIVAN
By
Greene, Pineles & Dunn
Attorney

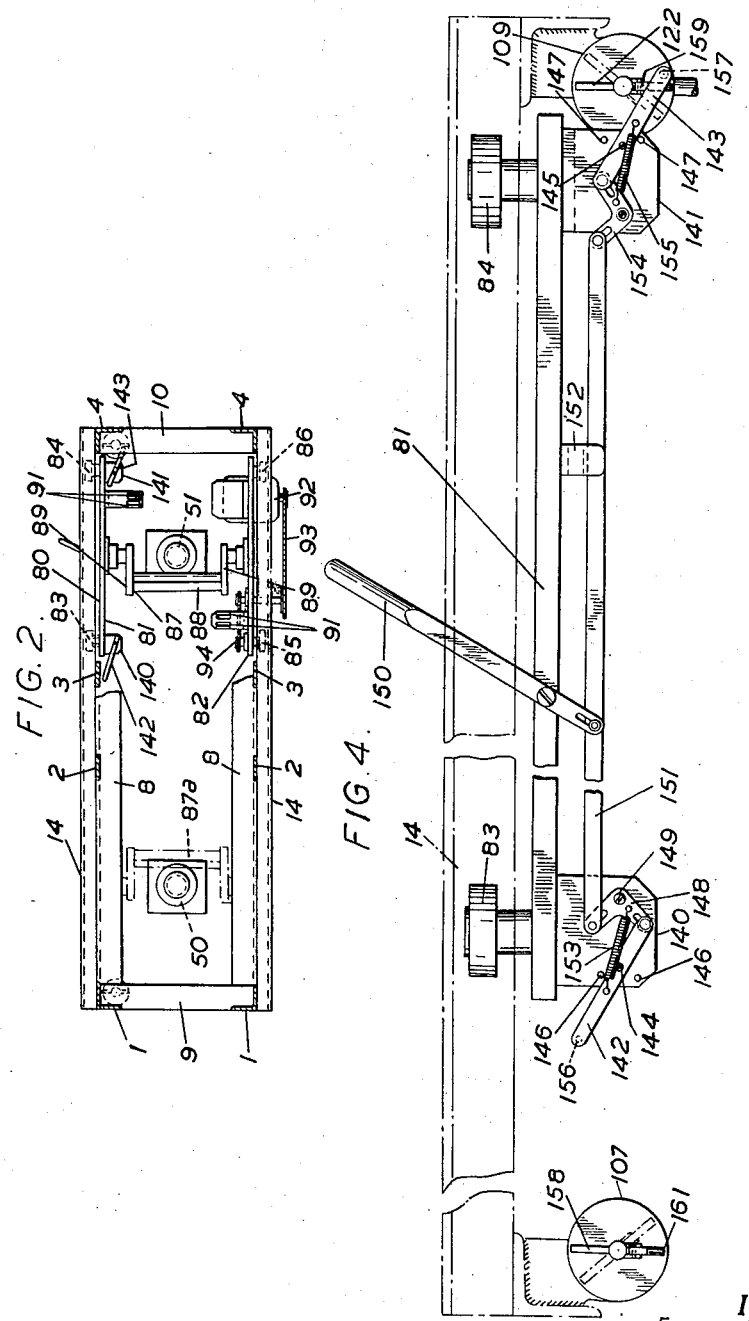

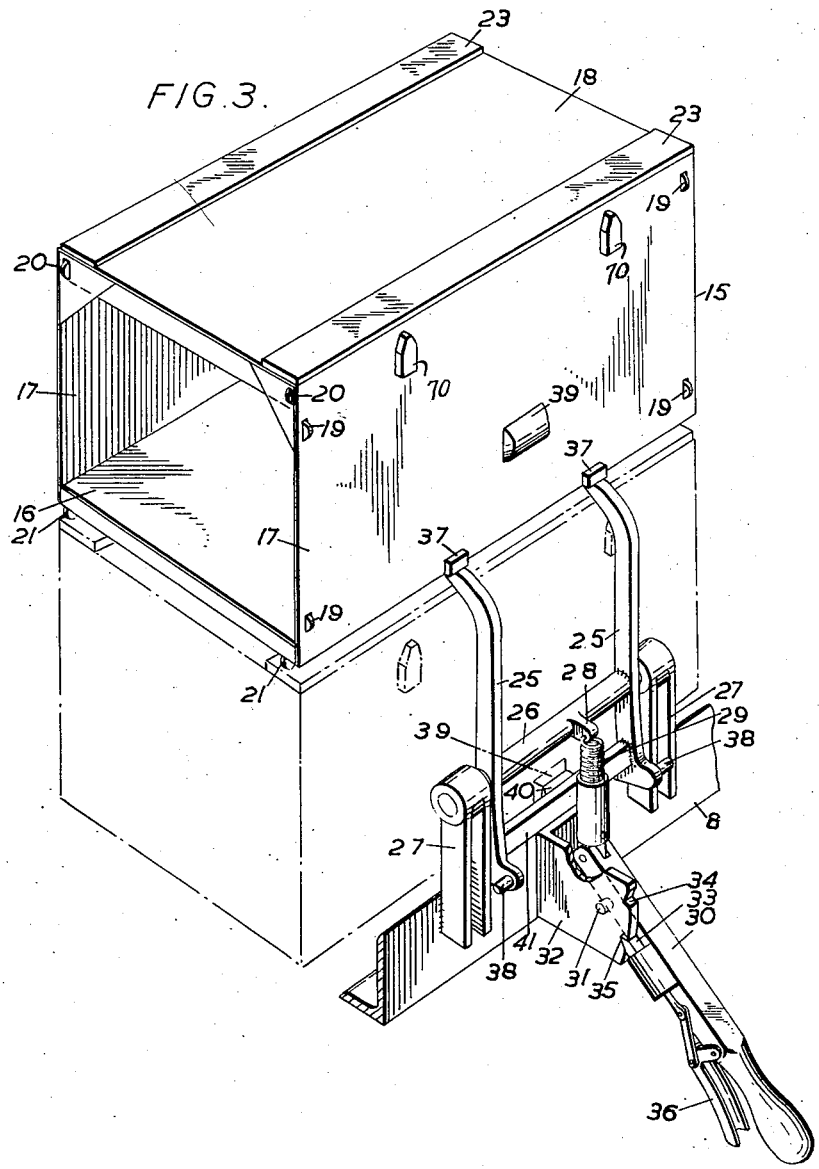
Sept. 11, 1956     E. O'SULLIVAN     2,762,489
APPARATUS FOR THE TRANSPORTING AND STORING OF GOODS
Filed March 16, 1951     4 Sheets-Sheet 3
*Inventor*
EUGENE O'SULLIVAN
By
*Attorney*

Sept. 11, 1956  E. O'SULLIVAN  2,762,489
APPARATUS FOR THE TRANSPORTING AND STORING OF GOODS
Filed March 16, 1951  4 Sheets-Sheet 4
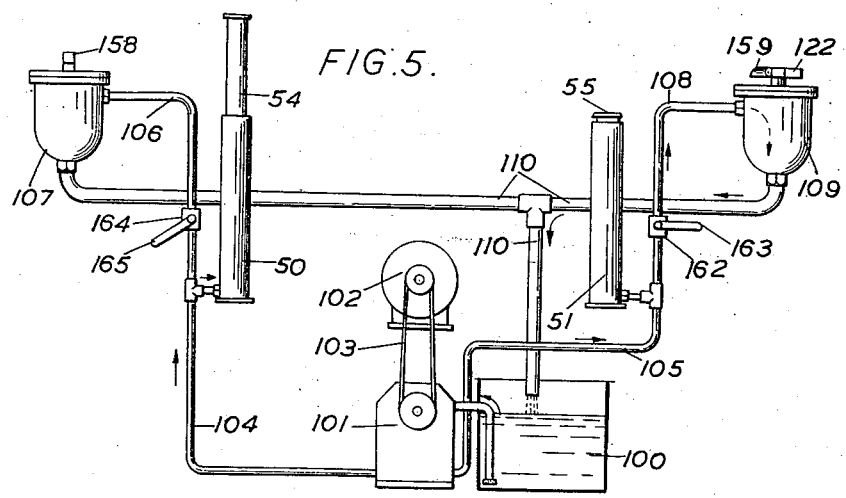
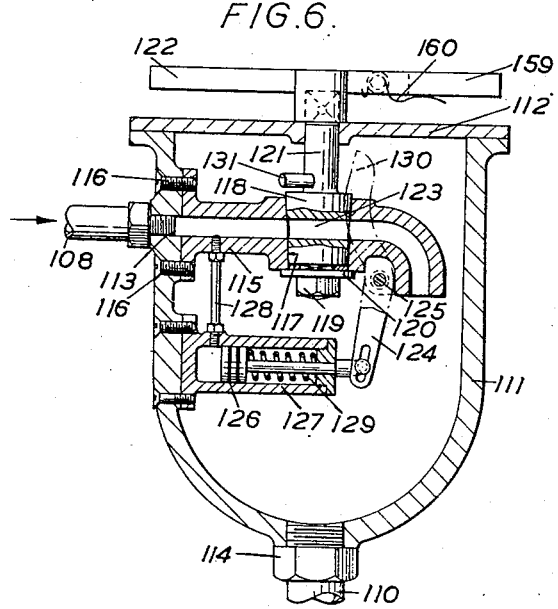
Inventor
EUGENE O'SULLIVAN
By Greene, Pindler & Durr
Attorney

United States Patent Office 2,762,489
Patented Sept. 11, 1956

2,762,489

APPARATUS FOR THE TRANSPORTING AND STORING OF GOODS

Eugene O'Sullivan, Chislehurst, England

Application March 16, 1951, Serial No. 216,014

Claims priority, application Great Britain March 16, 1950

9 Claims. (Cl. 198—85)

This invention relates to apparatus for use in the transport and/or storage of goods of various kinds, which apparatus is of the type which comprises a number of containers or platforms (hereinafter referred to as "containers") arranged in a continuous series in two columns, and means for causing the containers to travel upwardly in one column and downwardly in the other, for transferring the lowermost container in the descending column to the bottom of the ascending column and for transferring the uppermost container in the ascending column to the top of the descending column. In such apparatus the containers can be caused to travel round the system including the two columns until any selected container is brought to a loading, unloading or other desired position.

Apparatus of the above type can be constructed in many sizes adapted for various purposes including the garaging of motor vehicles and the storage and/or display of many other goods and articles. The apparatus of the present invention is suitable for many such purposes.

It is one of the objects of the present invention to provide such apparatus which includes novel and improved means for raising the containers in one of the columns while lowering the containers in the other column and for transferring the uppermost container in the ascending column to the top of the descending column while at the same time transferring the lowermost container in the descending column to the bottom of the ascending column.

A further object of the invention is the provision of apparatus which includes separate transfer members for transferring the containers from one column to the other at the top and at the bottom of the apparatus and which also includes means for synchronising the operation of such transfer members with the operation of the means used for raising and lowering the containers in the columns.

A further object of the invention is the provision of such apparatus in which the transfer members comprise trolleys running on rails or the like, above and below the columns, which trolleys are driven by means of separate motors, and wherein means are provided for automatically controlling the operation of these motors to cause them to operate in synchronism with each other and with the movements of the containers in the ascending and descending columns.

Yet a further object of the invention is the provision of improved means for raising and lowering the containers in the columns.

Another object of the invention is the provision of novel and improved means for supporting the containers in the columns while the uppermost and lowermost containers are being transferred between the two columns.

A further object of the invention is to provide such apparatus in which the movement of the containers is reversible so that any container can be brought to a desired position by the shortest and quickest path.

Further features and objects of the invention will become apparent from the following description of a preferred embodiment thereof, which will be given by way of example. Reference will be had to the drawings, in which:

Figure 2 is a plan view, partly cut away and in section and taken to a larger scale, of the trolley used for transferring the containers between the bottoms of the columns;

Figure 3 is a detail view, to a larger scale, showing part of the mechanism which is used for supporting the containers in the columns during the intervals between the raising and lowering of the containers;

Figure 4 is a detail view, also to a larger scale, showing part of the mechanism which controls the operation of the raising and lowering means;

Figure 5 is a diagrammatic view illustrating the operation of the raising and lowering means;

Figure 6 is a detail view taken in section, showing part of the mechanism of Figure 5.

Figure 1:
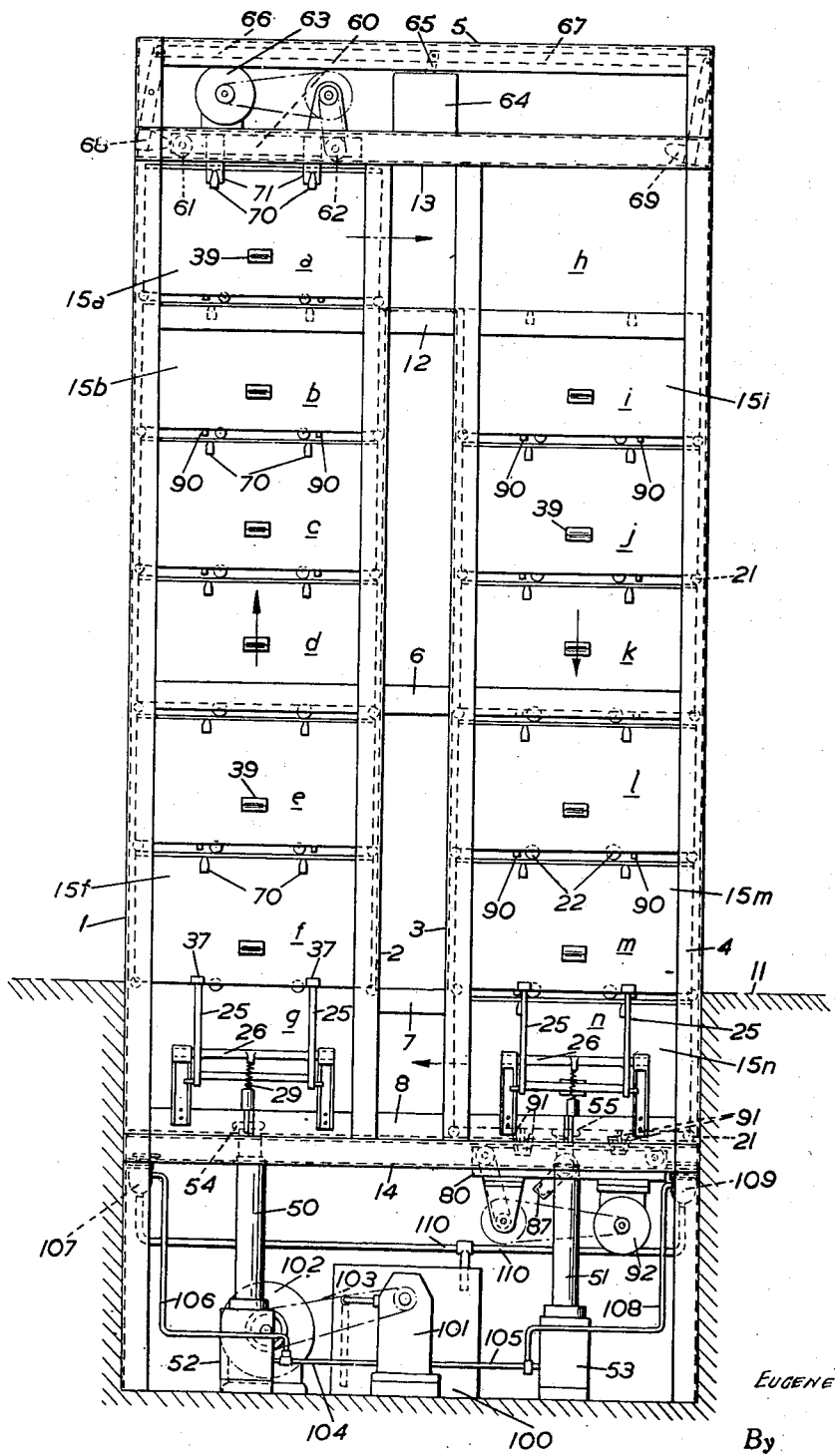
Figure 1 is a front elevational view of the apparatus, which is shown partly diagrammatically.

Referring to the drawings, the apparatus comprises a framework consisting of a number of pairs of uprights 1, 2, 3 and 4, which are connected together by means of cross members such as 5, 6, 7, 8, 9 and 10. As will be seen from Figure 1 the lower part of the framework may be sunk in the ground the surface of which is indicated at 11.

The corner uprights 1 and 4 are of angle section for their full length, but the intermediate uprights 2 and 3 are of angle section only between ground level and a point below their upper ends at which point they are joined by a pair of short rails 12. It will be noted that the intermediate uprights 2 and 3 are shorter than the corner uprights 1 and 4, their upper and lower ends being supported by means of front and back rail members 13 and 14 which are secured at their ends to the corner uprights.

The uprights 1 and 2 form a guideway for an ascending column of containers 15, while the uprights 3 and 4 form a guideway for a descending column of the containers.

The containers in each column rest directly on each other, each container being normally supported by the one below it. In the construction shown the height of the columns corresponds to that of seven superimposed containers, although in fact each column only includes six containers.

The positions which the containers can occupy in the columns are indicated by the references $a$, $b$, $c$, $d$, $e$, $f$ and $g$ and by the references $h$, $i$, $j$, $k$, $l$, $m$ and $n$ respectively, while the containers in the various positions at any one time will be referred to as necessary by the references $15a$, $15b$, etc.

Each container, the construction of which is best shown at 15 in Figure 3, is of open-ended box form comprising a floor 16, side walls 17 and a top 18. These parts may be attached to or may form part of a framework by means of which the container is given the necessary strength and rigidity.

The dimensions of the containers will depend on the purpose for which the apparatus is to be used. They may, for example, be large enough to contain a motor vehicle or they could be very much smaller if they are to be used for the storage of smaller objects.

Rollers 19 are mounted in the sides 17 of each of the containers so as to project from the latter in positions to engage the front and rear flanges of the uprights 1, 2, 3 and 4, while rollers 20 and 21 are provided at the ends of each of the containers in positions to engage the side flanges of these uprights. Besides projecting from the ends of the containers the rollers 21 also project below the latter so as to support the containers. Additional bottom rollers 22 (Figure 1) may also be provided.

When a container is at the bottom of a column in one of the positions $g$ or $n$ it is supported by the rollers 21 and 22 engaging the rails 14, whereas the successive containers above it are supported by their rollers 21 and 22 engaging the containers beneath them. For this purpose bearing strips or rails 23 are provided on the top of each container. Since the rails 14 extend from one column to the other the lowermost container can be transferred between the columns provided that means are provided for taking the weight of the upper containers in the respective columns. The means provided for doing this will be described in due course.

Furthermore, the uppermost container in one column, such as the container 15a can be transferred from that column to the top of the other column, the rails 12 forming continuations of the bearing strips of the containers 15b and 15i.

In order to support the containers 15f and 15m, and hence the containers above them, while the container 15n is being transferred from one column to the other, each of the columns is provided with support mechanism the construction of which is best shown in Figures 1 and 3. This mechanism is the same for each of the columns and is duplicated at the front and back of the apparatus, only the parts of the mechanisms at the front being shown.

Referring more particularly to Figure 3, each of the parts of the support mechanisms comprises a pair of support arms 25 which are rigidly secured to a shaft 26 journalled in supports 27. These supports 27 are rigidly secured to the members 8 of the frame of the apparatus.

The shaft 26 is provided with an arm 28 and a spring 29 is connected between this arm and the end of a lever 30. This lever, which is pivoted at 31 to a bracket 32 mounted on the member 8, can be set either to a lower position as shown, in which the spring 29 is put under compression, or to an upper position in which the spring 29 is put under tension. The lever 30 is retained in one position or the other by the engagement of a catch 33 in one or other of two notches 34 and 35 which are formed in the bracket 32. The catch 33 is controlled by a catch release lever 36 by means of which it can be released when the lever 30 is to be moved from one position to the other.

When the spring 29 is under compression, as is the case in Figure 3 of the drawings, it tends to rotate the shaft 26 in such a direction as to swing the upper ends of the support arms 25 inwardly into positions in which they engage projections 37 provided on the container so as to support the latter, whereas when the spring 29 is under tension it tends to swing the support arms 25 outwardly clear of the projections 37. Pins 38 are provided on the lower ends of the arms 25 on both the inner and outer sides of the supports 27 in order to limit the inward and outward movement of the arms 25.

When the apparatus is operating, the levers 30 of the support mechanism in the ascending column are set to their lower positions in which they cause the support arms 25 to be biased inwardly. In these positions the arms serve to support the container 15f even when there is no container in the lower position g. On the other hand, when a container has been brought to this latter position it can then be moved upwardly in the column past the arms 25 owing to the ends of the latter riding over the projections 37 on the container.

Each of the levers 30 of the support mechanism in the descending column is set to its upper position in which the spring 29 is tensioned, thus biassing the support arms 25 outwardly. The inward movement of these arms is effected by the engagement of a projection 39 one of which projections is provided on each side of each of the containers, against a projection 40 mounted on a bar 41 extending between the lower ends of the arms 25. The arrangement is such that as a container 15n reaches the position n in the descending column the projections 39 on it engage the projections 40, thus moving the upper ends of the support arms 25 inwardly into positions in which they engage the projections 37 of the next higher container 15m as the latter reaches the position m. The engagement of the projections 37 with the arms 25 then retains these arms in their inner positions during the movement of the container 15n across to the bottom of the ascending column. When, however, the weight of the container 15m is taken by the lowering mechanism, which will be described in due course, the support arms 25 are allowed to swing outwardly under the action of the springs 29.

The raising and lowering of the containers in the columns is effected by means of two hydraulic rams 50 and 51, which are mounted on suitable supports 52 and 53 respectively. The piston 54 of the ram 50 is adapted to engage under the container in the position g at the bottom of the ascending column and to raise this container to the position f. As the container reaches this position the support arms 25 engage under the projections 37 on the container and support the latter, and also the containers resting on it, while the piston 54 descends ready to allow a further container to be moved into position above it at the bottom of the ascending column.

The piston 55 of the ram 51 is adapted, as it reaches the limit of its upward travel, to engage the container in position m and to raise this container just enough to allow the support arms 25 to spring outwardly after which the piston 55 descends, thus lowering the containers in the descending column.

For transferring the successive containers from the top of the ascending column to the top of the descending column a transfer device is provided comprising a trolley which is indicated generally at 60. This trolley comprises a suitable framework which is provided with rollers 61 and 62 running on the rails 13, which rails are conveniently of channel section. The rollers 62 are driven from an electric motor 63 by means of any suitable driving connection, which may include a speed-reduction gearing.

The motor 63 is arranged to be reversed automatically as the trolley reaches the limit of its travel in each direction, a time delay being, however, provided between the stopping of the trolley and its re-starting. This is effected by means of a combined reversing and time delay switch 64 which may be of any suitable type. This switch is operated by a lever 65 which is connected, for example by means of rods 66 and 67, with two actuating members 68 and 69 provided at opposite sides of the apparatus. The arrangement is such that as the trolley 60 reaches the limit of its movement to the left, as seen in Figure 1, and is in position over the top of the ascending column of containers it engages the member 68 and rocks the lever 65 to the right. This stops the motor and starts a time-delay device, which operates after a predetermined interval to start the motor in reverse direction. The trolley 60 then travels to the right to the top of the descending column, when it engages the member 69 which operates the lever 65 to the left. This stops the motor and starts a time-delay device which causes the motor to re-start in the reverse direction after the required time interval.

In order that the movement of the trolley 60 may effect the transference of the containers from the top of the ascending column to the top of the descending column, each of the containers is provided with projections 70 (Figure 3) which are adapted, when the container reaches the limit of its upward movement, to engage in correspondingly-positioned forked lugs 71 (Figure 1) which project downwardly from the trolley 60.

The lugs 71 could also be arranged to effect the stopping and reversal of the trolley 60, either by engaging and operating the members 68 and 69 or by operating separate switches positioned near the ends of the rails 13.

For transferring the containers from the bottom of one column to the bottom of the other, a lower trolley 80 is provided, the construction of which is best shown in Figure 2.

This trolley comprises a pair of side members 81 and 82 which are provided with rollers 83, 84, 85 and 86 running on the rails 14. The two side members 81 and 82 are connected together by means of a cross member 87.

In the construction shown the rams 51 and 52 are shown as being mounted centrally beneath the columns of containers and, since the travel of the trolley 80 must be equal to the distance between the columns, the cross member 87 is cranked as shown, the main part 88 of the cross member being carried by cranks 89 which are journalled in suitable bearings provided in the side members 81 and 82.

When the trolley 80 reaches the limit of its movement to the right, as shown in Figure 2, the cross member 87 is swung to the position shown in full lines in this figure, whereas when the rolley travels to the left the cross member is swung to the position in which it is shown in broken lines at 87a, in order to make possible the full movement of the trolley.

While the movement of the cross member 87 could be effected simply by this member striking the sides of the rams, it is preferred to provide means for swinging the cross member into the desired position before it strikes the rams. Such means may comprise a roller (not shown) provided on one of the cranks 89 and a pair of fixed cams mounted on one of the rails 14 in positions to be engaged by the roller as the trolley approaches the limits of its travel.

In order that the trolley 80 may effect the transfer of the containers from one column to the other the containers are each provided on their under sides with projections 90 (Figure 1) which engage between pairs of lugs 91 provided on the trolley when a container reaches the bottom of the descending column.

The trolley 80 is provided with a driving motor 92 which drives the roller 85 by way of two driving chains 93 and 94. These chains are arranged to provide any necessary speed reduction.

The mechanism for controlling the operation of the rams 50 and 51 will now be described in greater detail, with particular reference to Figures 4, 5 and 6 of the drawings.

Referring especially to Figure 5, the rams are supplied with pressure oil from a reservoir 100 by means of a pair of positive displacement pumps which are contained within a casing 101 and both of which are driven from an electric motor 102 by means of a belt 103. The output from one of the pumps is taken to the ram 50 by means of a pipe 104, while the output from the other pump is taken to the ram 51 by way of a pipe 105.

The cylinder of the ram 50 is also connected by way of a pipe 106 with a control valve 107, while the cylinder of the ram 51 is connected by a pipe 108 with another control valve 109. The valves 107 and 109 are also connected with the reservoir 100 by means of return pipes 110.

The valves 107 and 109 are similar in construction. One of these valves, namely the valve 109, is shown in greater detail in Figure 6.

The valve comprises a bowl-shaped casing 111 which is provided with a cover 112. The bowl 111 is formed with an inlet connection 113, to which the pipe 108 coming from the cyinder 51 is connected, while it is also provided with an outlet connection 114 to which the return pipe 110 is connected.

The inlet connection opens into the end of a valve tube 115, which is secured to the side of the casing by means of screws 116. The tube 115 is formed with a vertical tapered bore 117 in which is fitted a tapered valve plug 118, which plug is held in position by means of a nut 119 and washer 120.

The plug 118 is provided with a stem 121 which extends through the cover 112 and carries an operating arm 122. By means of this arm 122 the valve can be turned to either an open position, in which a passage 123 formed in the plug 118 is in line with the bore of the tube 115, or to a closed position in which the passage 123 is transverse to the bore of the tube. When the valve is in its closed position the oil from the pump delivery builds up pressure in the cylinder of the ram 51, to operate the latter and to cause the piston 55 to rise, whereas when the valve is turned to its open position the oil from the pump and from the cylinder itself is allowed to return freely to the reservoir 100 by way of the pipes 110. This relieves the pressure in the cylinder and allows the piston 55 to descend.

The valves 107 and 109 are operated to their closed positions to cause the raising of the ram pistons 54 and 55 by the movements of the lower trolley 80, (as will be described in due course) but the valves are themselves provided with automatic mechanisms which will cause the valves to open automatically to lower the ram pistons as soon as the latter have reached the limits of their upward movement. This mechanism, which is arranged to operate as a result of the increase in the pressure of the oil which occurs when the corresponding ram has reached the limit of its upward travel, comprises an actuating lever 124 which is pivoted at 125 to a lug provided on the valve tube 115. The lower end of the lever 124 is connected by means of a pin and slot connection with the stem of a plunger 126 which is mounted in a cylinder 127 fitted on the inside of the casing 111. A tubular connection 128 connects the interior of the cylinder 127 with the tube 115 so that the piston 126 is acted upon by the pressure of the oil in the ram cylinder.

A spring 129 urges the piston 126 to the left, as seen in Figure 6, and the strength of this spring is sufficient to maintain the piston in this position even when the ram is raising a column of fully-loaded containers. When, however, the ram piston reaches the limit of its upward movement, the pressure in the hydraulic system will rise further, when it will reach a value sufficient to operate the plunger 126 against the force of the spring 129. This will rock the lever 124 about its pivot 125, thus causing the upper end 130 of the lever to engage an arm 131 projecting from the valve stem 121. This has the effect of opening the valve, thus allowing the oil to flow back to the reservoir and relieving the pressure in the cylinder, as a result of which the ram piston will descend.

The mechanism by means of which the movements of the lower trolley 80 are caused to operate the valves 107 and 109 will now be described with particular reference to Figure 4.

The side member 81 of the trolley 80 is provided with two inwardly-projecting plates 140 and 141, on which are mounted two actuating levers 142 and 143 which are pivoted at the points 144 and 145 respectively. The movements of the levers are limited by means of pins 146 and 147 projecting from the plates 140 and 141.

The lever 142 can be moved into position against one or the other of the pins 146 by means of mechanism including a bell crank 148 which is pivoted at 149 and which is adapted to be operated from a lever 150 through the intermediary of a connecting rod 151, which rod may be supported by guides such as 152 mounted on the member 81. A spring 153 connected between the actuating lever 142 and the bell crank 148 provides a snap-over action so that the lever 142 is held against one or other of the pins 146, depending on the position of the lever 150.

Similar mechanism comprising a bell crank 154 and a spring 155 is provided for controlling the position of the lever 143, it being noted that the arrangement of the bell crank 154 is such that when the projecting end of the lever 143 is in such a position that it extends in front of the central axis of the valve 109 the lever 142 is in the position in which its projecting end passes behind the axis of the other valve 107.

The levers 142 and 143 are provided at their ends with downwardly projecting pins 156 and 157 which are adapted to engage the actuating arms 158 and 122 of the valves 107 and 109 respectively in order to operate the valves, the arm 158 of the valve 107 being the equivalent of the arm 122 of the valve 109 previously described.

As shown in Figures 4, 5 and 6, one end of the actuating arm 122 is formed by a hinged element 159 which is normally held in its upper horizontal position as shown by means of a spring 160 (Figure 6). The side of the element 159 which normally faces the trolley 80, is, however, bevelled in such a manner that as the trolley nears the limit of its movement to the right, as seen in Figure 4, the pin 157, by engaging the bevelled face of the element 159, presses this element downwardly and thus rides over it without operating the valve. When, however, the trolley begins its reverse movement to the left, the pin 157, by engaging the other side of the element 159, turns the arm 122 to bring the valve from its open position in which the arm 122 is in the position shown in full lines in Figure 4, to its closed position which is indicated in broken lines.

The arm 158 of the valve 107 is constructed in a similar manner to the arm 122 of the valve 109 and is provided with a pivoted element 161 which is similar to the element 159. It will be seen, however, that with the levers 142 and 143 in the positions shown in Figure 4, when the trolley 80 nears the end of its travel to the left the pin 156 will engage the rigid part of the arm 158 and will thus operate the valve 108 to close the latter before the trolley reaches the end of its travel, instead of, as in the case of the valve 109, after the trolley has completed its travel and has started to move in the opposite direction.

By means of the control lever 150, however, the levers 142 and 143 can be moved to their other positions in order to cause the pin 156 to engage the element 161 and to operate the latter only on the return movement of the trolley, while, on the other hand, the pin 157 engages and operates a rigid part of the arm 122 before the trolley reverses its movement. The purpose of this arrangement is to enable the direction of the movement of the containers in the system to be reversed when required.

It should be noted that, irrespective of the setting of the lever 150, the effect of the levers 142 and 143 is always to close the valves 107 and 109, thus causing the corresponding ram to start to rise, while the valves are opened automatically as a result of the increase in pressure in the ram cylinders which occurs when the respective pistons have reached the limits of their upward movements.

The operation of the apparatus will now be described, it being assumed that the levers 30 have been set to the positions previously described so that the arms 25 of the left hand column (which in this case is the ascending one) are biassed inwardly, while the arms 25 of the other column are biassed outwardly. The lever 150 is set to the position shown in Figure 4, while the other parts are initially in the positions shown in Figure 1.

As soon as the main power supply to the motors 63, 92 and 102 is switched on the motors will begin to operate, as a result of which the upper trolley 60 will begin to travel to the right, taking with it the container 15a owing to the engagement of the lugs 71 on the bottom of the trolley with the projections 70 on the sides of the container. Similarly the trolley 80 will commence to travel to the left, taking with it the container 15n, the lower projections 90 of which are engaged by the lugs 91 on the trolley. The operation of the motor 102 will cause oil to be supplied to the two rams 50 and 51, but owing to the valves 107 and 109 at this time being open the pressure will not at first build up and the rams will remain in their lowered positions.

The movement of the trolley 80, however, will cause the pin 157 to engage the element 159 and thereby close the valve 109. Pressure will then start to build up in the ram 51, thus raising the piston 55. The apparatus is so designed that the piston does not engage the container 15n, but travels upwardly behind it after the container has moved out of the way of the piston.

When the piston 55 reaches the limit of its upward movement it engages the container 15n and raises the latter, together with the containers above it, just enough to release the support arms 25 which swing outwardly clear of the projections 37 on the container 15n. The stopping of the movement of the piston 55 due to it reaching the limit of its possible stroke then causes the pressure in the ram cylinder to build up sufficiently to operate the plunger 126 and thereby to open the valve 109. This relieves the pressure and allows the piston 55 to descend.

Since the piston 55 is carrying the full load of the containers in the column, means are provided for limiting the rate of the downward movement of the piston. This means may take the form of a flow restriction device 162 connected in the pipe 108. This device is provided with a by-pass controlled by a handle 163, the purpose of which by-pass will be described in due course.

As the trolley 80 nears the limit of its travel to the left the pin 156, by engaging the rigid part of the arm 158, closes the valve 107, thus causing the piston 54 of the ram 50 to rise. The piston thereupon engages under the container 15n, which has by now been brought to the position g at the bottom of the ascending column, and raises this container and with it the remaining containers in the column.

The container 15n is raised into the position f, the projections 37 passing the ends of the support arms 25 which are then moved inwardly by the action of the corresponding spring 29, which in this case is under compression, into positions beneath the projections 37.

When the piston 54 has completed its upward stroke pressure builds up in the ram cylinder until it causes the mechanism in the valve 107 to open the latter, thus allowing the piston to descend.

The pipe 106 is provided with a flow restriction device 164 which includes a by-pass controlled by a handle 165. Since the only force acting on the piston 54 to lower it is its own weight, the handle 165 is set to open the by-pass in order to obtain a sufficiently rapid lowering of the piston.

During the time that the lower trolley 80 was travelling to the left the upper trolley 60 was travelling to the right, taking the container 15a from the top of the ascending column into the position h at the top of the descending column. As the trolley 60 reaches the end of its movement it engages the member 69 and moves the switch lever 65 to the left. This operates the switch 64 to stop the driving motors of both trolleys, after which the motors are re-started in the reverse directions. The time delay provided by the switch 64 before the motors are re-started is sufficient to ensure that the container in the position h has time to disengage its lugs 71 from the projections 70 on the trolley before the latter starts its return movement, while it also provides time for the piston 54 to raise the container in the position g until the container is disengaged from the trolley 80.

The trolley 60 now carries out its return movement to the left and reaches the position shown in Figure 1, in which it is ready to engage the next container 15b in the ascending column, while the trolley 80 carries out its return movement to the right which brings it into position at the bottom of the descending column. The movement of the trolleys is stopped by the upper trolley engaging the member 68 and operating the switch 64, which latter, after an appropriate interval, re-starts the motors in the opposite directions. The cycle of operations previously described is then repeated.

It will thus be seen that the apparatus will continue to operate to raise the containers in the ascending column and to lower them in the descending column, while also effecting the transference of the containers between the columns at the top and bottom thereof. In this way any desired container can be brought to a selected position, which may, for example, be one of the positions f and m in which the container can be loaded or unloaded at ground level.

In order to enable any container to be brought to the desired position by the shortest path it is preferred to make the apparatus reversible so that the containers can be caused to move downwardly in the left-hand column of Figure 1 and upwardly in the right-hand column. To do this the levers 30 controlling the support arms 25 are reversed, the levers in the left-hand column being moved upwardly so as to put the corresponding springs 29 under tension and the levers in the right-hand column being moved downwardly in order to put the other springs 29 under tension. The lever 150 (Figure 4) is moved to its other position while the handles 163 and 165 (Figure 5) are reversed so as to open the by-pass for the flow restriction device 162 and to close the by-pass for the other flow restriction device 164. The apparatus will then operate in the manner described but in the reverse direction.

Various modifications are possible in the apparatus which has been described. For example, the motors 63 and 92, instead of being mounted on the trolleys 60 and 80 could be mounted on the framework of the apparatus, in which case they could be arranged to drive the trolleys by means of ropes, chains, screwed shafts or other suitable mechanisms. It would be possible to make use of a single motor driving both trolleys.

If necessary suitable brake means may be provided on or associated with the trolleys for stopping the latter and for holding them in their stopped positions during the engagement and disengagement of the containers with the trolleys. In this way any risk of the trolleys re-bounding from their limit stops can be avoided.

Such brake mechanism could be of any suitable type. It could, for example, be electro-magnetically operated and could include brake shoes or other elements mounted on the trolleys and adapted to engage the rails.

In the case of apparatus used for the garaging of vehicles it is desirable to provide means for preventing the vehicles from moving forwards or backwards while they are standing in the containers. These means may comprise movable wedges or stops which are provided in the floors of the containers. These stops may be operated mechanically or electrically (for example, by means of electromagnets) and they are preferably so connected with the main control system that the stops are automatically held in their raised positions whenever the containers are moved, whereas when any of the stops are depressed the containers are prevented from being moved. Furthermore, means may be provided for ensuring that, even when the containers are at rest, it is only the stops in the container at the loading or other specific position which can be lowered.

The stopping and starting of the apparatus to bring the containers to the required position may be controlled manually by means of a switch controlling the power supply to the motors 63, 92 and 102, or it may be controlled automatically, for example by means of push-buttons and control apparatus similar to that which is employed for automatic lifts. Thus numbered buttons could be provided, one corresponding to each container, the arrangement being such that when a button is pressed the corresponding container is brought to the desired position for loading or unloading.

Although separate members 30, 150, 163 and 165 have been shown all of which have to be operated to reverse the direction of movement of the containers, it would clearly be possible for these members to be interconnected mechanically, electrically or otherwise for simultaneous operation. In the case of an automatically controlled system the said members would be connected with the control in such a manner that the apparatus would always operate in such a direction as to bring a selected container to the required position by the shortest route.

Instead of using fluid-operated rams for raising and lowering the containers it would be possible to provide mechanically or electrically operated rams or other raising members.

I claim:

1. Apparatus for transporting or storing goods comprising a plurality of containers arranged in two substantially vertical columns with each superimposed container supported by the container below it, a hydraulic ram adapted to engage the lowermost container in one of said columns to raise the containers in that column, support members adapted to engage the said lowermost container to support the containers in said column during the downward movement of said ram, a second hydraulic ram adapted to engage the lowermost container in the other said column to lower the containers in that column, transfer members operable during intervals between the movements of the containers in said columns for transferring the uppermost container in the ascending column to the top of the descending column and for transferring the lowermost container in the desceending column to the bottom of the ascending column, support members adapted to engage the container in the descending column next above the container which is to be transferred to the ascending column to support the containers in the descending column, means providing a separate supply of fluid under pressure to each of said rams to raise the latter, and means responsive to an increase in fluid pressure resulting from each said ram reaching the limit of its upward movement to relieve the pressure in said ram to allow the latter to descend.

2. Apparatus as claimed in claim 1, wherein the means providing the fluid under pressure to said rams during the operation of the apparatus includes a continuously operable motor wherein the means for relieving the pressure comprises a pressure-operated relief valve for each ram adapted to open when the pressure in the ram exceeds a predetermined value and wherein said transfer members include means operated by the movement thereof for closing said relief valves in succession to initiate the upward movements of the respective rams.

3. Apparatus as claimed in claim 2, wherein the means for closing the relief valve for the ram of the descending column is operated by the movement of the lower transfer member away from that column and wherein the means closing the relief valve for the ram of the ascending column is operated by the movement of the lower transfer member towards said ascending column.

4. Apparatus as claimed in claim 3, comprising means for interchanging the operation of said relief valves so as to permit of the reversal of the direction of movement of the containers in the apparatus.

5. Apparatus for the transport or storage of goods comprising a plurality of containers arranged in two columns, a reciprocable raising member for raising the containers in one of said columns, a reciprocable lowering member for lowering the containers in the other of said columns, means for transferring the container reaching the top of the ascending column to the top of the descending column and separate means for transferring the container reaching the bottom of the descending column to the bottom of the ascending column, support members biased into operative position to engage the lowermost container in the ascending column to support the container in that column during the downward movement of the corresponding raising member, while allowing upward movement of the containers during the upward movement of the raising member, support members movable into an operative position in which they are engaged by the container in the descending column next above the container reaching the bottom of that column so as to support the containers in said column, means biassing the second said support members away from their operative position and actuating means for said second support members adapted to be eengaged by the container reaching the bottom of the descending column to move the second said support members into their operative position so as to be engaged by the next higher container in the column.

6. Apparatus as claimed in claim 5, wherein the support members for the descending column comprise pivoted arms the lower ends of which are connected with an actuating element, means on each of said containers adapted to engage said actuating element when said container nears the lowermost position in the descending column from which it is to be transferred to the ascending column, whereby the arms are rocked to bring their upper ends into position to be engaged by and to support the next higher container in the column.

7. Apparatus as claimed in claim 5, comprising means for reversing the bias of said biassing means acting on the support members in the two columns such that the support members in either one of the columns may be biassed towards their operative position while the support members for the other columns are biassed away from their operative position whereby the direction of movement of the containers in the apparatus may be reversed.

8. Apparatus for the transport or storage of goods comprising a plurality of containers arranged in two columns, a reciprocable raising member for raising the containers in one of said columns, a reciprocable lowering member for lowering the containers in the other of said columns, an upper transfer trolley adapted to engage the container reaching the top of the ascending column to transfer said container to the top of the descending column, an electric motor driving said upper transfer trolley, a lower transfer trolley adapted to engage the container reaching the bottom of the descending column to transfer said container to the bottom of the ascending column, an electric motor driving said lower transfer trolley, switch means operable by one of said trolleys reaching the limit of its movement to reverse the operation of its motor, said switch means including a time delay device effective to cause said trolleys to remain at rest, before restarting in the reverse directions, means controlled by the movement of one of said trolleys to cause the raising and lowering members to operate to raise and lower the containers in the respective columns, means for reversing the movement of the raising and lowering members and means effective during the transfer of the containers between the two columns at the lower part thereof for supporting the remaining containers in said columns, the means supporting the containers in the ascending column comprising support members adapted to be biased into engagement with the lowermost container in said column above the container being transferred to that column and the means supporting the containers in the descending column comprising support members adapted to be biased away from engagement with the containers in said column and means operated by a container reaching the lowermost position in said descending column, from which it is to be transferred to the ascending column, for moving said support members into operative position so as to be engaged by the next higher container in said descending column.

9. Apparatus as claimed in claim 8, comprising means for interchanging the operation of the support members in the two columns so as to permit of the reversal of the direction of movement of the containers in the apparatus.

References Cited in the file of this patent

UNITED STATES PATENTS

| | | |
|---|---|---|
| 1,811,545 | Goddard | June 23, 1931 |
| 1,851,502 | Ferris et al. | Mar. 29, 1932 |
| 1,965,161 | Sheflin | July 3, 1934 |
| 1,980,850 | Clark | Nov. 13, 1934 |